United States Patent
Osterried et al.

(10) Patent No.: US 11,808,288 B2
(45) Date of Patent: Nov. 7, 2023

(54) HYDRAULIC COMPONENT, HYDRAULIC ADJUSTMENT SYSTEM COMPRISING SUCH A HYDRAULIC COMPONENT, AND VEHICLE COMPRISING SUCH A HYDRAULIC ADJUSTMENT SYSTEM

(71) Applicant: HAWE Hydraulik SE, Aschheim (DE)

(72) Inventors: Jurgen Osterried, Pfronten (DE); Florian Mayr, Pähl-Fischen (DE); Peter Roider, Lappersdorf (DE); Paul Franz, Lengenwang (DE); Peter Muller, Augsburg (DE)

(73) Assignee: HAWE HYDRAULIK SE, Aschheim (DE)

( * ) Notice: Subject to any disclaimer, the term of this patent is extended or adjusted under 35 U.S.C. 154(b) by 237 days.

(21) Appl. No.: 17/173,954

(22) Filed: Feb. 11, 2021

(65) Prior Publication Data
US 2021/0254640 A1    Aug. 19, 2021

(30) Foreign Application Priority Data
Feb. 19, 2020  (DE) .................... 10 2020 202 147 U

(51) Int. Cl.
*G01D 5/14* (2006.01)
*F15B 15/28* (2006.01)
(Continued)

(52) U.S. Cl.
CPC ...... *F15B 15/2861* (2013.01); *F15B 15/1457* (2013.01); *G01D 5/145* (2013.01); *G01D 11/245* (2013.01)

(58) Field of Classification Search
CPC .............................. G01D 5/145; G01D 11/245
See application file for complete search history.

(56) References Cited

U.S. PATENT DOCUMENTS 3,956,973 A    5/1976  Pomplas
4,757,244 A    7/1988  Iwamoto et al.
(Continued)

FOREIGN PATENT DOCUMENTS

CN    106197242 A    12/2016
DE    10007737 A1    9/2001
(Continued)

OTHER PUBLICATIONS

International Search Report of DE Application No. 10 2020 202 147.3 dated Feb. 19, 2020.
(Continued)

*Primary Examiner* — Reena Aurora
(74) *Attorney, Agent, or Firm* — Dinsmore & Shohl LLP

(57) ABSTRACT

A hydraulic component for vehicles, such as for maritime applications, is a hydraulic cylinder-piston unit. The piston of the hydraulic component has a piston rod with a measurement section. A magnetic rod in the piston rod extends over the measurement section. The magnetic rod has a helically varied magnetic field direction. The hydraulic component includes a sensor device having a scanning region measuring the field direction. The sensor device is arranged such that, over the entire stroke path of the piston, at least a part of the magnetic rod is located in the scanning region. The sensor device has a sensor unit configured to transmit measurement results for the field direction to a processing unit, configured to process and output the measurement results. Furthermore, the present invention relates to a hydraulic adjustment system having at least one hydraulic component and a vehicle having at least one hydraulic adjustment system.

16 Claims, 7 Drawing Sheets

(51) Int. Cl.
*F15B 15/14* (2006.01)
*G01D 11/24* (2006.01)

(56) References Cited

U.S. PATENT DOCUMENTS

| | | | |
|---|---|---|---|
| 6,311,572 | B1 | 11/2001 | Gier |
| 6,666,784 | B1* | 12/2003 | Iwamoto ................ F01L 9/20 137/554 |
| 2002/0157531 | A1 | 10/2002 | Kadlicko |
| 2003/0148674 | A1 | 8/2003 | Divisi |
| 2006/0232268 | A1 | 10/2006 | Arns, Jr. et al. |
| 2016/0264239 | A1* | 9/2016 | Fenny ................ B64C 27/605 |

FOREIGN PATENT DOCUMENTS

| | | |
|---|---|---|
| DE | 10046500 A1 | 3/2002 |
| DE | 20218754 U1 | 2/2003 |
| DE | 10248148 A1 | 4/2004 |
| DE | 102007048057 A1 | 4/2009 |
| DE | 102017222674 A1 | 7/2018 |
| EP | 0979988 A1 | 2/2000 |
| JP | 2008-536145 A | 9/2008 |
| JP | 2011-246052 A | 12/2011 |

OTHER PUBLICATIONS

Japan Patent Office, Notice of Reasons for Rejection issued in corresponding Japanese application No. 2021-020501, dated Jan. 27, 2022, 11 pp.

Office Action issued by German Patent Office in priority application DE102020202147.3, dated May 16, pp. 1-7.

* cited by examiner

HYDRAULIC COMPONENT, HYDRAULIC ADJUSTMENT SYSTEM COMPRISING SUCH A HYDRAULIC COMPONENT, AND VEHICLE COMPRISING SUCH A HYDRAULIC ADJUSTMENT SYSTEM

CROSS-REFERENCE TO RELATED APPLICATIONS

The present application claims priority to German patent application 10 2020 202 147.3, filed Jan. 20, 2020 and entitled "Hydraulic component, hydraulic adjustment system comprising such a hydraulic component, and vehicle comprising such a hydraulic adjustment system," which is incorporated by reference herein in its entirety.

FIELD OF THE INVENTION

The present invention relates to a hydraulic component which is provided in particular for a hydraulic adjustment system of a vehicle, in particular for maritime applications. Furthermore, the present invention relates to a hydraulic adjustment system with such a hydraulic component as well as to a vehicle with a corresponding hydraulic adjustment system.

BACKGROUND OF THE INVENTION

So-called trim-tilt units, also known as trim-pivot units, are hydraulic adjustment systems that are used in particular in maritime vehicles such as boats. Depending on the area of application, they are used to move different components of the respectively provided drive arrangements. In boats with an outboard motor, for example, a trim-tilt unit is used to control a tilt or pivot movement and a trim movement of the outboard motor. During a tilt movement of the outboard motor, the motor is moved between a rest position and an operation position. In the rest position, the propeller of the outboard motor is only just below the water surface or even more or less far above the water surface. In the operation position, the propeller of the outboard motor is at an operation depth within the water. For this purpose, a massive tilt hydraulic component in the form of a cylinder-piston unit is usually provided, which is centrally positioned in the trim-tilt unit. The trim movement is ultimately used to fine-tune the outboard motors propeller in the operation position to optimally align the outboard motor's propeller relative to the hull from an efficiency standpoint. Also, this allows for increased ride comfort as well as noticeably increased propeller life due to reduced cavitation. The necessity of such a trim movement results in particular from the changing orientation of the hull relative to the waterline depending on the respective load, weight distribution and the speed of the boat. In this case, the trim movement usually runs along the direction of the tilt movement. For this purpose, the trim-tilt unit commonly comprises two smaller (compared to the massive tilt hydraulic component) trim hydraulic components in the form of cylinder-piston units flanking the central tilt hydraulic component. Thus, the rough tilt movement is predominantly performed by the tilt hydraulic unit, while the trim movement is essentially controlled by the trim hydraulic components.

Finally, the trim-tilt unit may be provided with at least one steering hydraulic component. Via this, a rough alignment of the outboard motors propeller transverse to the direction of the tilt movement is then performed in order to influence the direction of travel while the boat is being driven. In such an embodiment, at least one further trim hydraulic component can also be provided to finely adjust the alignment of the propeller of the outboard motor in the direction of the steering movement.

Such a trim-tilt unit is known, for example, from WO 01/98142 A1.

Even though reference is made here only to a trim-tilt unit for a boat with an outboard motor, such or at least similar trim-tilt units are also used in other vehicles, such as boats with inboard motors or jet skis, to move or align various components of the drive and/or steering equipment. Whereas in boats with outboard motors the trim-tilt unit moves the entire outboard motor, in boats with inboard motors usually only the propeller itself is moved, possibly together with a rudder coupled to it. In jet skis, on the other hand, the trim-tilt unit regularly moves a baffle and/or rudder that deflects a water jet driving the jet ski to affect the direction of travel and/or propulsion efficiency of the jet ski.

A positioning movement, i.e. in particular a trim-tilt movement, is meanwhile regularly automatic or system-controlled and no longer manual, which significantly increases the accuracy of the respective positioning movement. Alternatively, a device can also be provided which outputs a specific signal to a user of the trim-tilt unit which reflects the current position of the trim-tilt unit. For this, however, it is necessary for the trim-tilt unit to have appropriate sensor devices that determine the current orientation of the component to be moved or adjusted. In view of the often harsh environmental conditions, especially in the maritime sector with wetness and salt, there are very high demands on such sensor devices in terms of robustness and reliability. It should also be noted that the tilt movement is relatively rough and the trim movement following the tilt movement is relatively small in comparison.

In view of this, known trim-tilt units are regularly provided with at least one analog movement sensor device. The use of analog sensor devices is intended to increase the robustness of the overall design. To save costs, the sensor device is configured as a comparatively rough sensor device, since only the very rough movement of the component to be moved is to be monitored.

Even though such configurations have proven to be quite suitable for monitoring the trim and pivot movements of trim-tilt units, they still have some room for improvement.

On the one hand, it can be seen that the large number of sensor devices to be provided both increases the cost of the trim-tilt unit formed and negatively affects its reliability, since the failure of even one of the sensor devices provided makes correct control of the trim-tilt unit impossible. This is of considerable relevance, especially in view of the regularly harsh environmental conditions in maritime applications. In order to be better protected against harmful environmental influences, the sensor devices are then regularly permanently installed within the respective hydraulic components of the trim-tilt unit. At the same time, however, this makes it more difficult to access the respective sensor device and to replace, inspect or maintain it. Furthermore, an accurate orientation determination by the respective sensor devices very often also requires a reference run for calibration. This costs time and is costly for a user. Finally, the analog measurement signals output are regularly particularly susceptible to external influences such as interference fields or the like, and can also only be used to a very limited extent.

SUMMARY OF THE INVENTION

Thus, it is an object of the present invention to provide a hydraulic component which is particularly suitable for the above-described applications, overcoming at least some of the above-described disadvantages. Furthermore, it is an object of the present invention to provide a corresponding adjustment system as well as a vehicle in which at least some of the disadvantages described above have been overcome.

These objects are solved by the some of the embodiments disclosed herein. Advantageous further embodiments of the various subject matters of the present invention are apparent from this disclosure.

According to a first aspect, the present invention relates to a hydraulic component for vehicles. In particular, the hydraulic component is configured for maritime applications. The hydraulic component is configured as a hydraulic cylinder-piston unit comprising at least one piston and at least one cylinder. The piston is at least partially accommodated in the cylinder to form at least one stroke chamber within the cylinder. The piston is movable relative to the cylinder, wherein this movement is changing the volume of the at least one stroke chamber. The cylinder has at least one inlet and at least one outlet, which are configured to connect the at least one stroke chamber to further hydraulic components. The piston comprises a piston rod with a measurement section, wherein a magnetic rod with a helical magnetic field direction extending over the measurement section is provided in the piston rod. The hydraulic component further comprises a sensor device, the sensor device having a scanning region in which the sensor device measures the magnetic field direction. The sensor device is configured such that over the entire stroke path of the piston, at least a portion of the magnetic rod of the piston rod lies within the scanning region of the sensor device. The sensor device has a sensor unit and a processing unit, the sensor unit being configured to transmit measurement results for the magnetic field direction within the scanning region to the processing unit. The processing unit is configured to process and output the measurement results received from the sensor unit.

Measuring a magnetic field direction that changes as a function of a relative position between the piston and the cylinder within a scanning region of the sensor device is a particularly reliable way of monitoring the relative movement between the piston and the cylinder and consequently the stroke state of the hydraulic component. This is due in particular to the fact that the measured values are recorded without contact, which means that the respective components of the sensor device can be particularly well encapsulated against external environmental influences. The immediate processing of the measurement results in the processing unit provided allows simple adaptation of the hydraulic component or the signals it outputs to systems, such as control systems, which receive and utilize the measurement results of the sensor device. In this context, the signals output by the processing unit can be both analog and digital signals, depending on the requirements of the hydraulic component. Furthermore, the processing unit provided enables an initial pre-processing or preparation of the measurement results, which considerably facilitates and improves the subsequent utilization of the respective measurement results. Accordingly, the overall accuracy can be improved by a factor of 3 to 10. The processing unit can also already contain an internal memory on which data, programs or the like required for processing are or will be stored.

Advantageously, the processing unit is configured to output analog and/or digital signals, in particular in the form of electrical voltage, CAN signals or pulse-width modulated signals. Analog signals are particularly easy to process. Digital signals are particularly versatile and can contain significantly more information than analog signals. Pulse-width modulated signals are a particularly simple and practical way of designing such digital signals.

It is also advantageous if the sensor device is calibrated to the specific magnetic rod provided. This is particularly advantageous because different combinations of sensor device and magnetic rod can output different measurement results for the same relative movements (particularly with regard to the respective value range). This is because each magnetic rod is individual to a certain degree, so that different values are output despite the structural equality of two magnetic rods. This calibration thus creates a uniquely matched pair of sensor device and magnetic rod, which ultimately leads to accurate results.

Advantageously, the calibration causes the measurement results to be finally obtained by the processing unit to extend over a predetermined range of values. For example, in the case that the output measurement results are in the form of a voltage value, a voltage range, i.e. a range over which the measurement results extend, is increased. This makes it possible to use the entire available range of values for measurement results completely, or at least as completely as possible. This effectively represents an amplification of the signal. Alternatively, the measurement results can be compressed to lie completely within the specified range of values. This allows peaks to be reliably resolved and thus effectively suppresses noise. For example, a so-called two-point calibration can be used for corresponding calibrations. Such a calibration is particularly simple and effective.

It is particularly advantageous if the sensor device is linearized with regard to the specific provided magnetic rod. This means that the processing unit is programmed on the basis of a test run in such a way that the measured values output by the processing unit as expected (which indicate the stroke of the piston rod) show a substantially linear profile. This makes it possible for the output measurement results to negate the undesirable influences of side effects, such as hysteresis effects and non-linearities, on the measurement results. In particular, after linearization, the measurement results output by the processing unit actually show a substantially linear profile. Measurement results with such a linear profile are particularly suitable for reproducing the actual and commonly linear stroke of the piston rod.

In preferred embodiments, the processing unit is provided in the form of a circuit board, which in particular has a size of 9×11 mm. Such circuit boards can be arranged in a particularly space-saving manner, have relatively low interference fields and are very reliable, even under harsh environmental conditions. The specified particularly small size of the circuit board allows the saving of installation space.

Preferably, the sensor unit has a magnetoresistive sensor and/or a Hall sensor. Such sensor variants are particularly reliable and can also be obtained relatively inexpensively nowadays.

It is also advantageous when the helical magnetic field direction of the magnetic rod has a constant helix pitch. Such a design is particularly simple and thus inexpensive to obtain. Furthermore, in the case of an error analysis, which is necessary if unusual or incorrect measurement results are obtained, it is particularly easy to check the magnetization of the magnetic rod of the piston rod for correctness or to correct it. Finally, with such an arrangement, no complex conversion of the analog measurement results of the sensor unit into a relative position is necessary, since these are directly related.

Alternatively, the helical magnetic field direction of the magnetic rod may have a varied, i.e., non-constant, helix pitch. In other words, the helix pitch of the helical magnetic field direction varies along the magnetic rod. In particular, the helix pitch varies either continuously or discontinuously. This makes it possible to define different sub sections along the magnetic rod and to monitor or verify the relative movement between the piston and the cylinder also based on information about these sub sections.

It is particularly advantageous if the magnetic rod has at least one fine measurement section and one rough measurement section. The rough measurement section is larger than the fine measurement section, in particular 2 times, 5 times or even 10 times as large as the fine measurement section. The helical magnetic field direction of the magnetic rod has a smaller helix pitch in the fine measurement section than in the rough measurement section, in particular a helix pitch that is 0.75 times, 0.5 times or even 0.25 times as small as in the rough measurement section. This makes it possible to divide the overall range of relative movement of the piston with respect to the cylinder into different sub-ranges with different measurement accuracy. In particular, the magnetic rod has two fine measurement sections that enclose the rough measurement section. This means that a relative movement of the piston with respect to the cylinder in the vicinity of the end positions can be monitored particularly finely and consequently can also be controlled with corresponding accuracy. Consequently, it is possible to prevent the piston from hitting the end positions. Furthermore, if the hydraulic component is used as the tilt hydraulic component of a trim-tilt unit, the hydraulic component can be controlled particularly precisely, especially in the trim range, which generally adjoins the lower end position of the piston. This is particularly important for the trim process. During the pivot movement, on the other hand, rough monitoring along the rough measurement section is quite sufficient. This finally results in particularly expedient monitoring of the relative movement of the piston with respect to the cylinder.

Advantageously, the sensor device further comprises a C-shaped support body configured to be fixed to a housing of the cylinder, in particular to an upper end of the housing of the cylinder, and to at least partially surround the piston. In particular, the support body has a receiving area in which the sensor unit and the processing unit are provided in such a way that the scanning region of the sensor device is located inside the C-shaped support body and that the processing unit does not influence the measurement of the sensor unit as far as possible.

In particular, the support body can have a material that does not distort, falsify and/or weaken the magnetic field within the scanning region of the sensor device. The C-shape of the support body enables it to grip around the piston of the hydraulic component and thus to attach the sensor device to the cylinder in a particularly reliable manner. By providing the sensor unit and the processing unit within the receiving area of the support body, the sensor unit and the processing unit are protected particularly efficiently from negative environmental influences. This provides a particularly robust and reliable configuration.

In such an implementation, it is preferred that the support body has at least one mounting opening through which at least one mounting member is guided, the mounting member engaging in at least one corresponding engagement region formed on the housing of the cylinder in order to fasten the support body to the housing. This makes it possible to fasten the support body and thus the sensor device to the housing of the cylinder in a particularly simple and reliable manner. Furthermore, this makes it particularly easy to detach and replace the support body together with the sensor unit and the processing unit from the cylinder if a malfunction is detected.

Preferably, the hydraulic component is configured as a tilt hydraulic component for a hydraulic adjustment system of a vehicle, in particular for maritime applications. This means that such a hydraulic component can be used as a tilt hydraulic component in a corresponding adjustment system.

A second aspect of the present invention relates to a hydraulic adjustment system for vehicles, in particular for maritime applications, wherein the hydraulic adjustment system comprises at least one of the hydraulic components described above. In such an embodiment, the advantages of the respective hydraulic components are transferred to a corresponding hydraulic adjustment system.

Preferably, the hydraulic adjustment system is a trim-tilt unit. In particular, in such systems a trim movement also causes a movement of the piston of the tilt unit. Consequently, the trim movement can also be monitored on the basis of a pivot movement of the tilt hydraulic component. Thus, only the tilt hydraulic component needs to be provided in the manner described above. The trim hydraulic components, on the other hand, can be formed without sensor devices, which increases the reliability of the entire hydraulic adjustment system and reduces its cost.

A third and final aspect of the present invention relates to a vehicle, in particular for maritime applications, wherein the vehicle comprises at least one of the hydraulic adjustment systems described above. This enables the advantages of the respective hydraulic adjustment systems to be transferred to the corresponding vehicle.

In an advantageous embodiment, the vehicle is a jet ski or a boat, in particular a sports boat with an outboard motor. In such an embodiment, the advantages of the respective hydraulic components or hydraulic adjustment systems weigh particularly heavily.

BRIEF DESCRIPTION OF THE DRAWINGS

In the following, a merely exemplary but particularly advantageous embodiment of the present invention is described with reference to the accompanying figures, wherein.

DETAILED DESCRIPTION OF THE PREFERRED EMBODIMENTS

Figure 1:
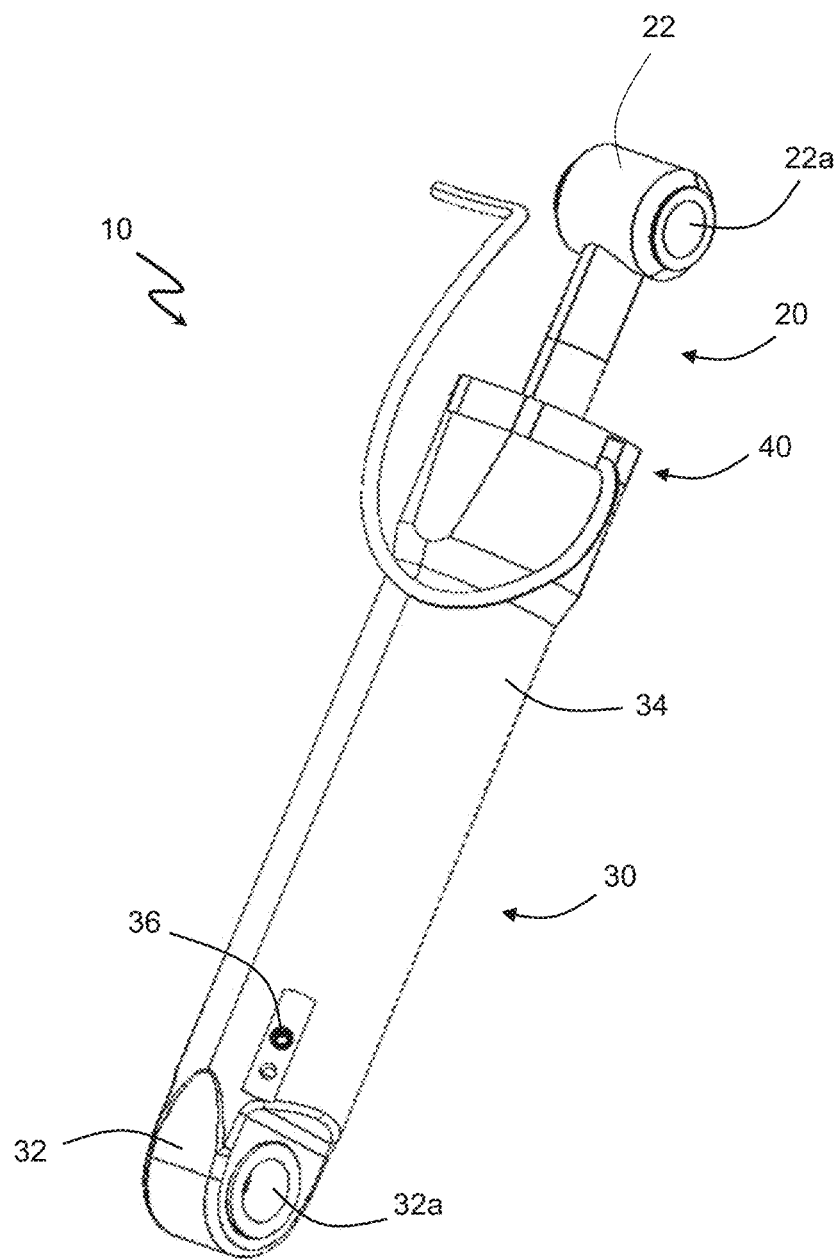
FIG. 1 shows a perspective view of a hydraulic component according to the exemplary embodiment.

As shown in FIG. 1, according to an exemplary embodiment of the present Invention a hydraulic component 10 comprises a piston 20 and a cylinder 30, which together form a hydraulic cylinder-piston unit. Further, the hydraulic component 10 includes a sensor device 40. The sensor device 40 is attached to the end of the housing 34 of the cylinder 30 at which the piston 20 protrudes from the cylinder 30. The piston 20 includes a piston head 22 configured to be mechanically attached to a component to be moved, such as an outboard motor of a boat (not shown). The cylinder 30 includes a cylinder base 32 adapted to be mechanically attached to a support component, such as a hull of a boat (not shown). Here, both the piston head 22 and the cylinder base 32 are provided with a respective pivot bearing 22a and 32a. These pivot bearings 22a and 32a allow rotational movement of the hydraulic component with respect to the respective components mechanically coupled thereto. Further, the cylinder 30 is provided here with a combined in- and outlet 36. The combined in- and outlet 36 is used to supply hydraulic fluid from a pump unit (not shown) to a stroke chamber formed within the cylinder 30, or to discharge the hydraulic fluid from the stroke chamber. Although a combined in- and outlet 36 is provided here, two separate ports may of course be provided.

Figure 2:
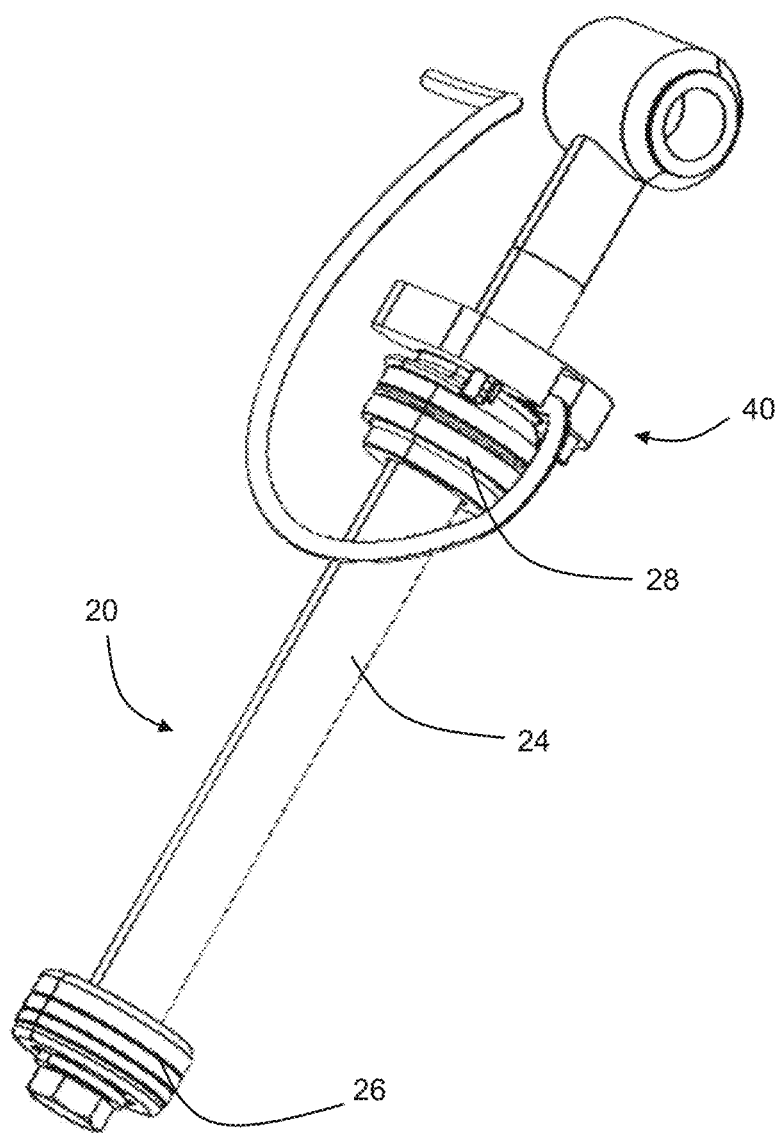
FIG. 2 shows a perspective view of the hydraulic component from FIG. 1 without the cylinder.

In FIG. 2, the hydraulic component 10 of FIG. 1 is shown with the cylinder 30 omitted to illustrate the internal structure of the hydraulic component 10.

In addition to the piston head 22, the piston 20 also includes a piston rod 24 and a piston end 26, as well as a fixation element 28 movably provided relative to the piston rod 24.

In the assembled state of the hydraulic component 10, the stroke chamber is confined by the housing 30 of the cylinder 30, the cylinder base 32, and the piston end 26. Consequently, an introduction of hydraulic fluid through the combined in- and outlet 36 into the stroke chamber results in the piston 20 or piston rod 24 being raised or extended out of the cylinder 30. If the hydraulic fluid is discharged from the stroke chamber, this results in the piston 20 or piston rod 24 being lowered or retracted into the cylinder 30. The fixation element 28 serves to guide the piston 20 on the cylinder 30 and to stabilize the axial relative movement between the piston 20 and the cylinder 30.

To enable more accurate operation of the hydraulic component 10, the fixation element 28 may further be formed as a sealing element to form an additional stroke chamber between the housing of the cylinder 34, the piston end 26 and the fixation element 28. In this case, the cylinder has an additional in- and outlet (not shown) for connecting this additional stroke chamber to a supply and disposal unit for hydraulic fluid. The additional stroke chamber is then always supplied with hydraulic fluid or freed from hydraulic fluid in the opposite direction to the primary stroke chamber, in order to be able to control a relative movement between the piston 20 and the cylinder 30 more precisely and stably.

Figure 3:
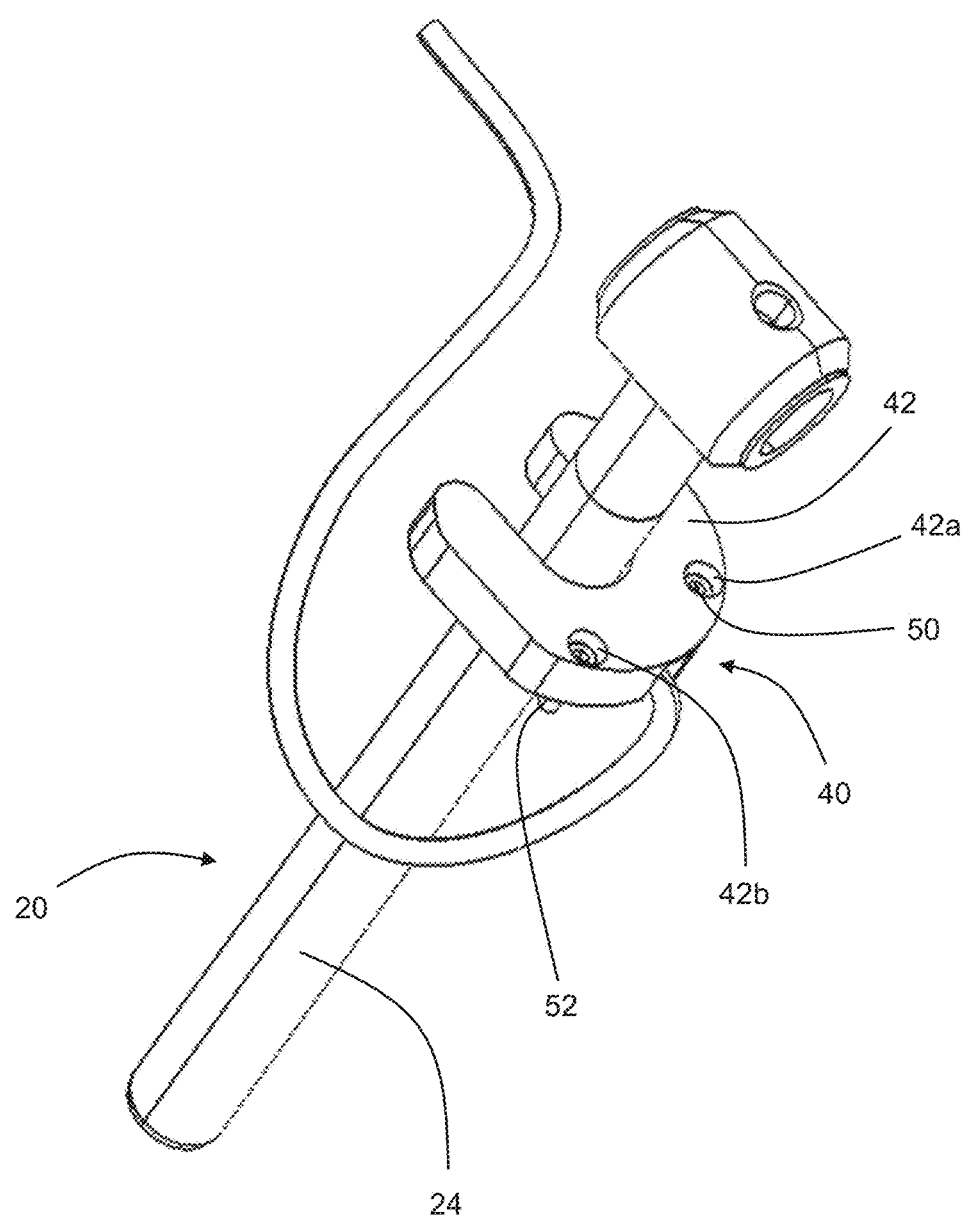
FIG. 3 shows a perspective view of the hydraulic component of FIG. 2, with other components of the hydraulic component omitted.

FIG. 3 shows the hydraulic component 10 of FIG. 1, with the piston end 26 and the fixation element 28 further omitted in addition to the cylinder 30, so that the sensor device 40 is clearly visible.

As can be clearly seen here, in the present embodiment the sensor device 40 has a C-shaped support body 42. This is provided here with two mounting openings 42a and 42b. The mounting openings 42a and 42b are formed as stepped through-holes and are suitable for receiving corresponding mounting members 50 and 52. Although not shown here, the housing 32 of the cylinder 30 has two engagement portions at its upper end. These are adapted to receive the mounting members 50 and 52, thereby releasably securing the sensor device 40 to the housing 32 of the cylinder 30. Thus, a relative movement of the piston 20 with respect to the cylinder 30 also simultaneously causes a relative movement of the piston 20 or the piston rod 24 with respect to the sensor device 40. Here, the mounting members 50 and 52 are configured as bolt screws, although other designs for fastening the sensor device 40 to the cylinder 30 would also be conceivable.

Figure 4:
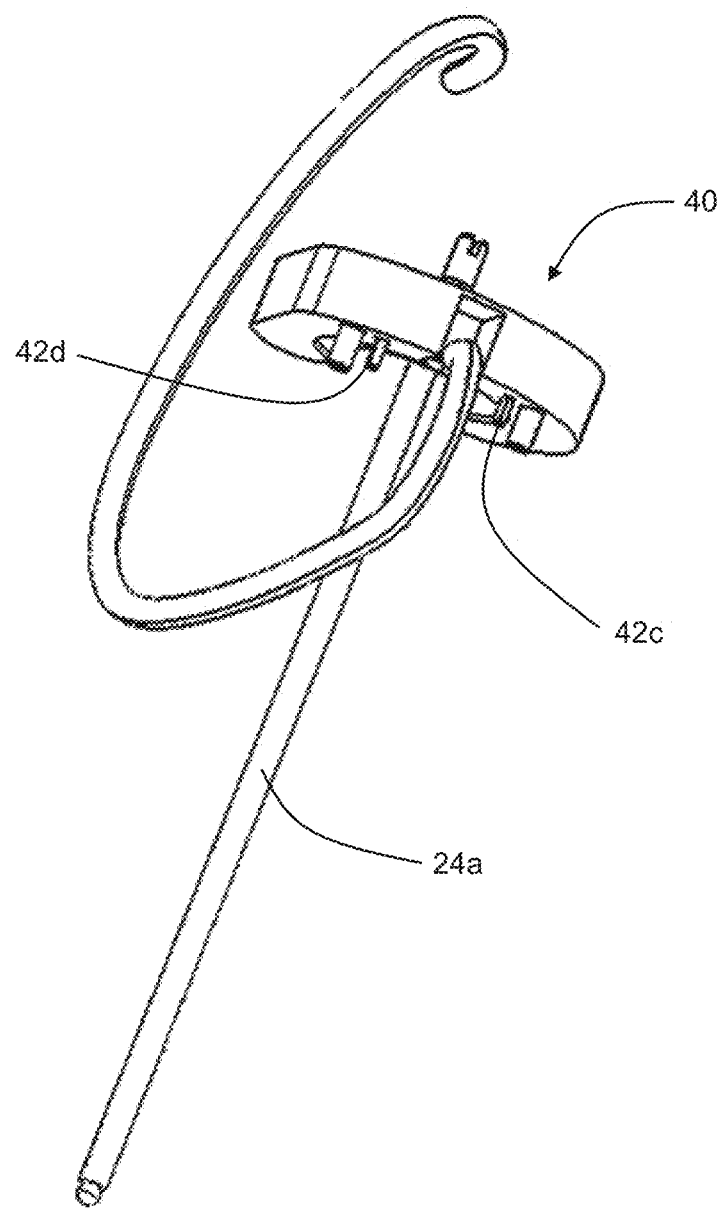
FIG. 4 shows a perspective view of the hydraulic component of FIG. 3, with some additional elements of the piston rod omitted here.
Figure 7:
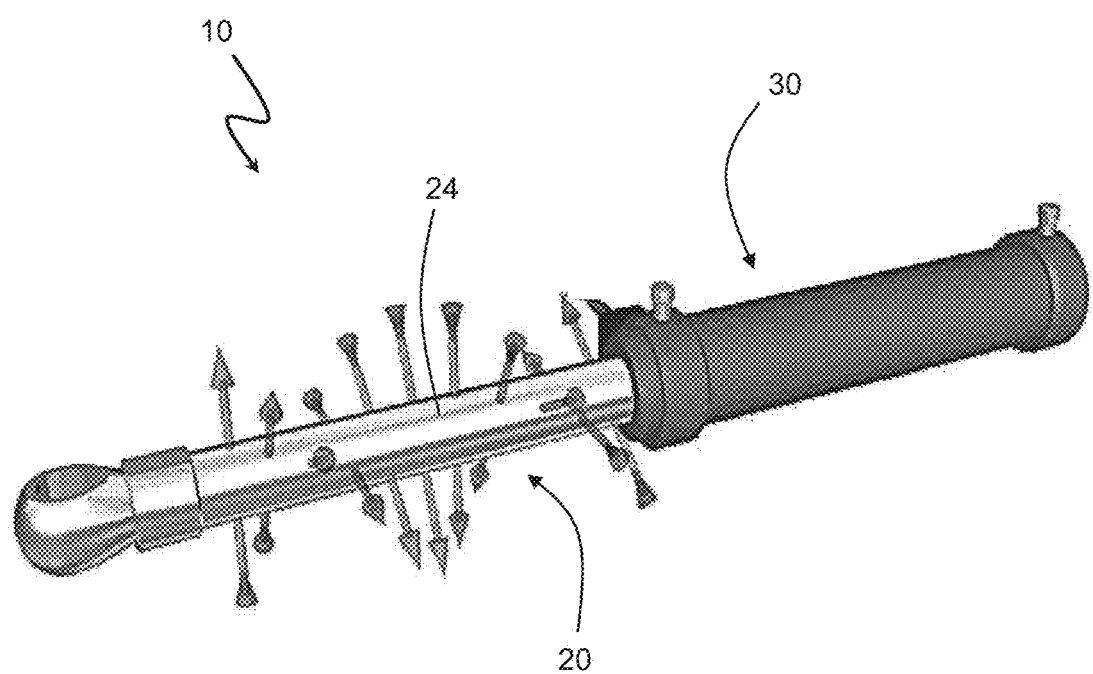
FIG. 7 shows a perspective view of an exemplary hydraulic component that includes a piston rod with a helical magnetic field direction.

As shown in FIG. 4, the piston rod 24 has a cavity in which a magnet rod 24a is provided along a longitudinal direction of the piston rod 24. The magnetic rod 24a has a helical magnetic field direction that always extends in a plane substantially perpendicular to the longitudinal direction of the magnetic rod 24a and runs around the magnetic rod 24a along the longitudinal direction of the magnetic rod 24. An example of a hydraulic component 10 having a piston 20, which has a magnetic rod (not shown) with a helical magnetic field direction, pressed into a piston rod 24 of the piston 20, and a corresponding cylinder 30 is shown in FIG. 7. This magnetic rod 24a and the magnetic field generated by it define a measurement section of the piston rod 24.

As indicated in FIG. 7 by the arrows extending from the piston rod 24, the helix pitch of the helical magnetic field direction of the magnetic rod 24a, and consequently of the piston rod 24, may be constant over the measurement section.

Alternatively, the helix pitch of the helical magnetic field direction of the magnetic rod 24a, and consequently of the piston rod 24, may vary over the measurement section, in particular continuously or discontinuously. In this case, it is particularly advantageous if the magnetic rod 24a is divided into at least one range, but in particular into two ranges, namely at least one fine measurement section(s) and a rough measurement section. In this case, the rough measurement section should be larger, in particular significantly larger, than each of the provided fine measurement sections. In the fine measurement section(s), the helical magnetic field direction has a smaller helix pitch than in the rough measurement section.

This enables particularly fine monitoring of the movement of the piston 20 or the magnetic rod 24a relative to the cylinder 30 in certain movement ranges.

Further, reference is made here to two alignment pins 42c and 42d which are provided on the C-shaped support body. These serve to be inserted into corresponding receiving openings provided on the housing 32 of the cylinder 30 when the sensor device 40 is mounted on the cylinder 30. This facilitates proper alignment of the sensor device 40 with respect to the cylinder 30 prior to attachment of the sensor device 40 to the cylinder 30 with the mounting members 50 and 52.

Figure 5:
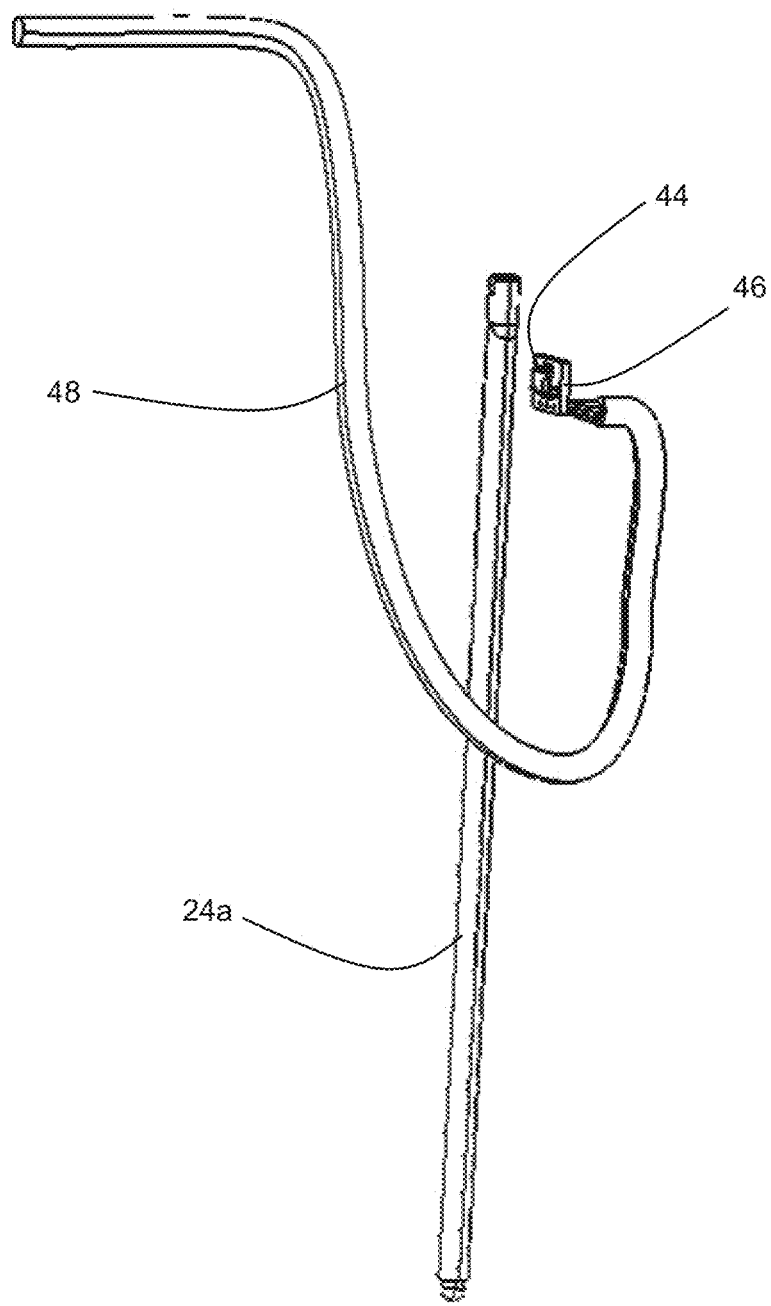
FIG. 5 shows a perspective view of the hydraulic component of FIG. 4, with the C-shaped support body and corresponding mounting members omitted.

Further, for FIG. 5, as compared to FIG. 4, the support body 40 and the mounting members 50 and 52 have been omitted. This makes it possible to identify the sensor unit 44 provided in the sensor device 40 and the processing unit 46 connected thereto. The sensor unit 44 is adapted to measure the magnetic field direction in a specific scanning region. For this purpose, the sensor unit 44 has, for example, a magnetoresistive sensor and/or a Hall sensor. In this case, the sensor unit 46 is positioned in such a way that the magnetic rod 24a in the piston rod 24 lies at least partially in the scanning region of the sensor unit 44 and thus in the scanning region of the sensor device 40 over the entire stroke movement of the piston 20 relative to the cylinder 30.

Due to a movement of the piston 20 relative to the cylinder 30, the magnetic field direction changes via the particular magnetization of the magnetic rod 24a in the scanning region of the sensor unit 46. This is documented by the sensor unit 44 via measurement results, which the sensor unit 44 transmits directly to the processing unit 46 connected to it.

The processing unit 46, configured here in the form of a particularly small circuit board, is configured to receive and process the measurement results of the sensor unit 44 and then to output them, here via the cable 48. In this embodiment, the circuit board is only 9×11 mm in size, but can be made even smaller if possible. In addition to a wired output, wireless variants are of course also conceivable. In the present case, however, the cable 48 is used not only to output the processed measurement results but also to supply power to the processing unit 46. In particularly advantageous embodiments, the housing 34 of the cylinder 30 can have a cable duct (not shown) in which the cable 48 is guided along the cylinder 30. This leads not only to a particularly robust but also to a particularly space-saving overall configuration.

In particular, the processing unit 46 outputs the measurement results obtained from the sensor unit 44 as analog and/or digital signals. Examples of suitable signal configurations are a voltage, CAN signals and/or pulse width modulated signals.

Furthermore, the sensor device 40 is calibrated to the specifically provided magnetic rod 24a. In particular, this ensures that all measurement results output by the processing unit 46 as expected extend over a predetermined range of values. In other words, the measurement results are stretched or compressed such that they extend over the entire range of values available. This effectively provides signal amplification or noise reduction, depending on whether stretching or compression occurs. In particular, this calibration can be done by means of a two-point calibration. Such a calibration is particularly simple and functional.

Alternatively, or in addition, the sensor device 40 may be linearized with respect to the specific magnetic rod 24a provided. In other words, the processing unit is programmed in such a way that it adapts the measured values in such a way that these have a profile as linear as possible for the specifically intended magnetic rod 24a. In particular, the measured values output by the processing unit as expected have a linear profile. This negates the unwanted influence of side effects such as hysteresis, non-linearity or the like. Correspondingly output measurement results are particularly easy to analyze and to process further.

Both calibration and linearization produce a matched pair of sensor device and magnetic rod, which leads to particularly good measurement results. The necessary steps are usually carried out at the factory, i.e. before delivery of the hydraulic component.

Figure 6:
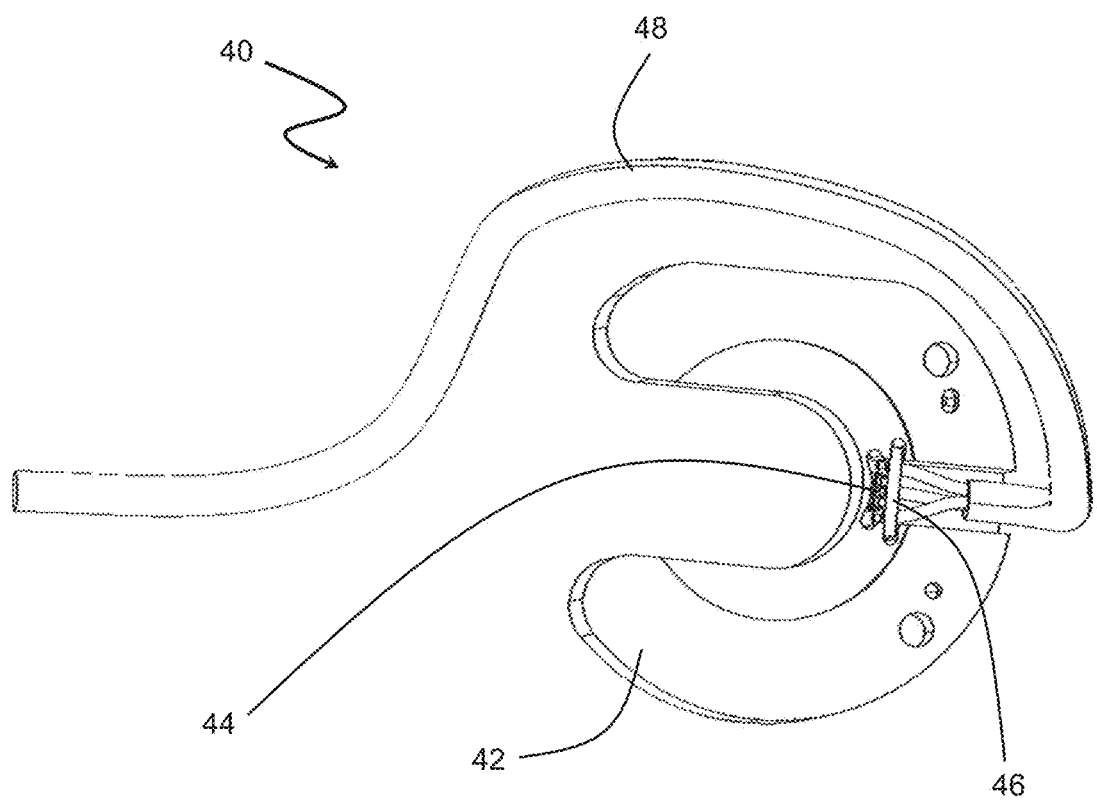
FIG. 6 shows a perspective view of the sensor device of the aforementioned figures from below.

As can be seen in particular in FIG. 6, the sensor unit 44 and the processing unit 46 are provided in a receiving area within, and in particular below, the support body 42. Thus, in the assembled state of the hydraulic component 10, the sensitive sensor unit 44 and the sensitive processing unit 46 are particularly well protected against harsh environmental influences. To further improve this protection, the sensor unit 44 and the processing unit 46 may be surrounded by a suitable filling compound. This filling compound can then also simultaneously serve as an adhesive between the sensor unit 44, the processing unit 46, the cable 48 and the support body 42.

Via this embodiment, a hydraulic component 10 is achieved which is particularly resistant to external environmental influences and, at the same time, is able to monitor the relative movement of the piston 20 with respect to the cylinder 30 particularly accurately and reliably.

This makes such a hydraulic component 10 particularly suitable as a tilt hydraulic component for a hydraulic adjustment system of a maritime vehicle, for example for a trim-tilt unit of a sports boat with an outboard motor. In such an application, hydraulic components without separate sensor devices can advantageously be used for the trim hydraulic components.

As described above, the present invention further relates to a corresponding hydraulic adjustment system and to a vehicle having such a hydraulic adjustment system.

LIST OF REFERENCE SIGNS 10 hydraulic component
20 piston
22 piston head
22a pivot bearing
24 piston rod
24a magnetic rod
26 piston end
28 fixation element
30 cylinder
32 cylinder base
32a pivot bearing
34 housing
36 inlet and outlet
40 sensor device
42 support body
42a mounting opening
42b mounting opening
42c alignment pin
42d alignment pin
44 sensor unit
46 processing unit
48 cable
50 mounting member
52 mounting member

The invention claimed is:

1. A hydraulic adjustment system for vehicles for maritime applications, the hydraulic adjustment system comprising:
    at least one hydraulic component configured as a hydraulic cylinder-piston unit with a piston and a cylinder;
    the piston being at least partially accommodated in the cylinder in order to form at least one stroke chamber within the cylinder;
    the piston being movable relative to the cylinder, wherein the volume of the at least one stroke chamber changes during movement of the piston relative to the cylinder;
    the cylinder having at least one inlet and at least one outlet, which are configured to connect the at least one stroke chamber to further hydraulic components;
    the piston having a piston rod with a measurement section, the piston rod further having a magnetic rod extending along the measurement section in the piston rod, the magnetic rod having a helical magnetic field direction;
    a sensor device having a scanning region in which the sensor device measures the magnetic field direction;
    the sensor device being arranged such that over an entire stroke movement of the piston at least a part of the magnetic rod of the piston rod lies within the scanning region of the sensor device;
    the sensor device having a sensor unit and a processing unit, the sensor unit being configured to transmit measurement results relating to the magnetic field direction within the scanning region to the processing unit; and the processing unit being configured to process and output the measurement results obtained by the sensor unit.

2. The hydraulic adjustment system according to claim 1, wherein the processing unit is configured to output analog and/or digital signals, in the form of electrical voltage, CAN signals and/or pulse-width modulated signals.

3. The hydraulic adjustment system according to claim 1, wherein the sensor device is calibrated to a specific provided magnetic rod, in such a way that expected measurement results output by the processing unit extend over a predetermined range of values.

4. The hydraulic adjustment system according to claim 3, wherein the sensor device is configured such that the expected measurement results show a linear profile.

5. The hydraulic adjustment system according to claim 1, wherein the processing unit is provided in the form of a circuit board.

6. The hydraulic adjustment system according to claim 5, wherein the circuit board has a size of 9×11 mm.

7. The hydraulic adjustment system according to claim 1, wherein the sensor unit comprises a magnetoresistive sensor and/or a Hall sensor.

8. The hydraulic adjustment system according to claim 1, wherein the helical magnetic field direction of the magnetic rod has a constant helix pitch.

9. The hydraulic adjustment system according to claim 1, wherein the helical magnetic field direction of the magnetic rod has a helix pitch that varies, in particular continuously or discontinuously.

10. The hydraulic adjustment system according to claim 9, wherein the magnetic rod has at least a fine measurement section and a rough measurement section, the rough measurement section being larger than the fine measurement section, the helical magnetic field direction of the magnetic rod having a smaller helix pitch in the fine measurement section than in the rough measurement section.

11. The hydraulic adjustment system according to claim 1, wherein:
the sensor device comprises a C-shaped support body configured to be fixed to a housing of the cylinder and to at least partially surround the piston;
the support body has a receiving area in which the sensor unit and the processing unit are provided in such a way that the scanning region of the sensor device is located inside the C-shaped support body and that the processing unit does not influence the measurement of the sensor unit.

12. The hydraulic adjustment system according to claim 11, wherein the C-shaped support body is configured to be fixed to an upper end of the housing of the cylinder.

13. The hydraulic adjustment system according to claim 11, wherein the support body has at least one mounting opening through which at least one mounting member is passed, the mounting member engaging at least one corresponding engagement region formed on the housing of the cylinder to mount the support body to the housing of the cylinder.

14. The hydraulic adjustment system according to claim 1, wherein the hydraulic adjustment system is configured as a trim-tilt unit.

15. A vehicle for maritime applications, wherein the vehicle comprises at least one hydraulic adjustment system according to claim 1.

16. The vehicle according to claim 15, wherein the vehicle is a jet ski or boat or a sports boat with an outboard motor.

* * * * *